United States Patent
Robinson et al.

(10) Patent No.: US 8,235,153 B2
(45) Date of Patent: Aug. 7, 2012

(54) MOTORIZED WHEELBARROW

(76) Inventors: Kenneth I. Robinson, Flatts (BM);
Stephanie Dashiell Robinson, Flatts (BM)

( * ) Notice: Subject to any disclaimer, the term of this patent is extended or adjusted under 35 U.S.C. 154(b) by 706 days.

(21) Appl. No.: 12/007,679

(22) Filed: Jan. 14, 2008

(65) Prior Publication Data
US 2009/0178864 A1 Jul. 16, 2009

(51) Int. Cl.
B62D 51/04 (2006.01)
(52) U.S. Cl. ...................................................... 180/19.3
(58) Field of Classification Search ................... 180/19.3
See application file for complete search history.

(56) References Cited

U.S. PATENT DOCUMENTS

| | | | |
|---|---|---|---|
| 2,716,031 A | 8/1955 | Roessler | |
| 3,950,005 A | 4/1976 | Patterson | |
| 3,951,426 A * | 4/1976 | Shaffer et al. | 280/47.34 |
| 4,479,658 A | 10/1984 | Michaux | |
| 4,588,197 A * | 5/1986 | Benedetto, Jr. | 280/47.18 |
| 4,589,508 A * | 5/1986 | Hoover et al. | 180/19.1 |
| 4,640,520 A | 2/1987 | Wing et al. | |
| 4,877,104 A * | 10/1989 | Morrison | 180/308 |
| 4,962,833 A | 10/1990 | McCurdy | |
| 4,984,768 A * | 1/1991 | Kolber et al. | 297/16.1 |
| 5,465,801 A * | 11/1995 | Hoover | 280/47.26 |
| 5,690,191 A | 11/1997 | Burbank | |
| 5,878,827 A | 3/1999 | Fox | |
| 5,924,708 A * | 7/1999 | Bisaillon et al. | 280/47.26 |
| 6,065,555 A * | 5/2000 | Yuki et al. | 180/19.1 |
| 6,148,963 A | 11/2000 | Canfield, Jr. | |
| 6,244,366 B1 * | 6/2001 | Otterson et al. | 180/11 |
| 6,286,631 B1 | 9/2001 | Kimble | |
| 6,443,267 B1 | 9/2002 | Burbank et al. | |
| 6,470,981 B1 * | 10/2002 | Sueshige et al. | 180/19.3 |
| 6,488,130 B1 | 12/2002 | Bermel | |
| 6,571,656 B1 | 6/2003 | Wells | |
| 6,745,859 B2 * | 6/2004 | Simons et al. | 180/19.1 |

(Continued)

FOREIGN PATENT DOCUMENTS

JP 52-48789 4/1977

(Continued)

OTHER PUBLICATIONS

Staton-Inc., motorizedwheelbarrow.com website: http://www.motorizedwheelbarrow.com/ 3 pages printed from the Internet on Sep. 1, 2007.

Primary Examiner — Lesley D. Morris
Assistant Examiner — Daniel Yeagley
(74) Attorney, Agent, or Firm — Richard C. Litman

(57) ABSTRACT

The motorized wheelbarrow has longitudinally extending frame members, which extend into handle portions. Resting height adjustment of the wheelbarrow is achieved with a pair of tubular legs cooperatively attached to a wheelbarrow support strut and a support strut brace. A wheel is secured proximate the front end of the wheelbarrow to mounting points on a wheel frame. An electric motor is attached to a front portion of the support frame members underneath a load rack or load bucket, depending on the barrow type. A battery is attached under the support frame proximate the motor. A drive mechanism consisting of a chain and sprocket is operably linked to a wheel sprocket and to the electric motor. A disk brake assembly having a disk rotor and caliper is disposed on the wheel and frame for engagement with the wheel and is operably engaged to a control mechanism for safe wheelbarrow stopping.

9 Claims, 9 Drawing Sheets

U.S. PATENT DOCUMENTS

| | | |
|---|---|---|
| 6,957,495 B1 | 10/2005 | Schmillen |
| 6,983,827 B2 | 1/2006 | Swift |
| 7,032,718 B1 | 4/2006 | Lessard |
| 7,354,059 B2 * | 4/2008 | Black .................... 280/653 |
| 2002/0005619 A1 | 1/2002 | Cote |
| 2002/0084119 A1 * | 7/2002 | Brabetz et al. ............. 180/65.3 |
| 2002/0166733 A1 | 11/2002 | Bermel |
| 2003/0141686 A1 * | 7/2003 | Willis .................... 280/47.34 |
| 2005/0178623 A1 | 8/2005 | Swift |
| 2005/0258007 A1 | 11/2005 | Albert |
| 2007/0007089 A1 | 1/2007 | Silberman et al. |
| 2007/0079998 A1 * | 4/2007 | Walter .................... 180/19.1 |
| 2007/0079999 A1 | 4/2007 | Lamanna |
| 2007/0089917 A1 * | 4/2007 | Hartley .................... 180/65.1 |

FOREIGN PATENT DOCUMENTS

| | | |
|---|---|---|
| JP | 2-144259 | 6/1990 |

* cited by examiner

MOTORIZED WHEELBARROW

BACKGROUND OF THE INVENTION

1. Field of the Invention

The present invention relates to motorized wheelbarrows, and more particularly to a motorized wheelbarrow having a manually controlled braking system.

2. Description of the Related Art

The usefulness of wheelbarrows is well known to those involved in construction, gardening, and other uses where loads are moved and transported form one place to another. The wheelbarrow is a unique tool in that due to its single wheel design a relatively heavy load may be balanced and moved. Wheelbarrows are also useful in that they may be used to move loads over rough and difficult terrain where other means of transport would be very difficult.

Heretofore, attempts have been made to power or motorize wheelbarrows by using gasoline-powered engines in order to propel the wheelbarrow and load carried in the wheelbarrow. However, such wheelbarrows end up being bulky, cumbersome, and difficult and dangerous to use in many types of terrain. Further, such wheelbarrows are excessively heavy and unbalanced requiring the user to shift and manipulate the load to compensate therefore, which detracts from the power, gained from the motor.

Thus, a motorized wheelbarrow solving the aforementioned problems is desired.

SUMMARY OF THE INVENTION

The motorized wheelbarrow has longitudinally extending support frame members, which extend into handle portions. Resting height adjustment of the wheelbarrow is achieved with a pair of tubular legs cooperatively attached to a wheelbarrow support strut and a support strut brace. A wheel is secured proximate the front end of the wheelbarrow to mounting points on a wheel frame, the wheel frame being attached to the longitudinally extending frame members. An electric motor is attached to a front portion of the support frame members underneath a load rack or load bucket, depending on the barrow type. A battery is attached under the support frame proximate the motor. A drive mechanism having a chain and sprocket is operably linked to a wheel sprocket and to the electric motor. A disk brake assembly having a disk rotor and caliper is disposed on the wheel and frame for engagement with the wheel and is operably engaged to a control mechanism for safe stopping.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

As shown in FIGS. 1-5, the present invention is a wheelbarrow 10a, 10b, which may have four position adjustable tubular legs 500. Preferably the legs 500 are of stainless steel construction. Preferably the wheelbarrow 10a, 10b, should weigh no greater than approximately 55 lbs. Each wheelbarrow 10a, 10b may be fitted with a hydraulically actuated disk braking system.

Figure 1:
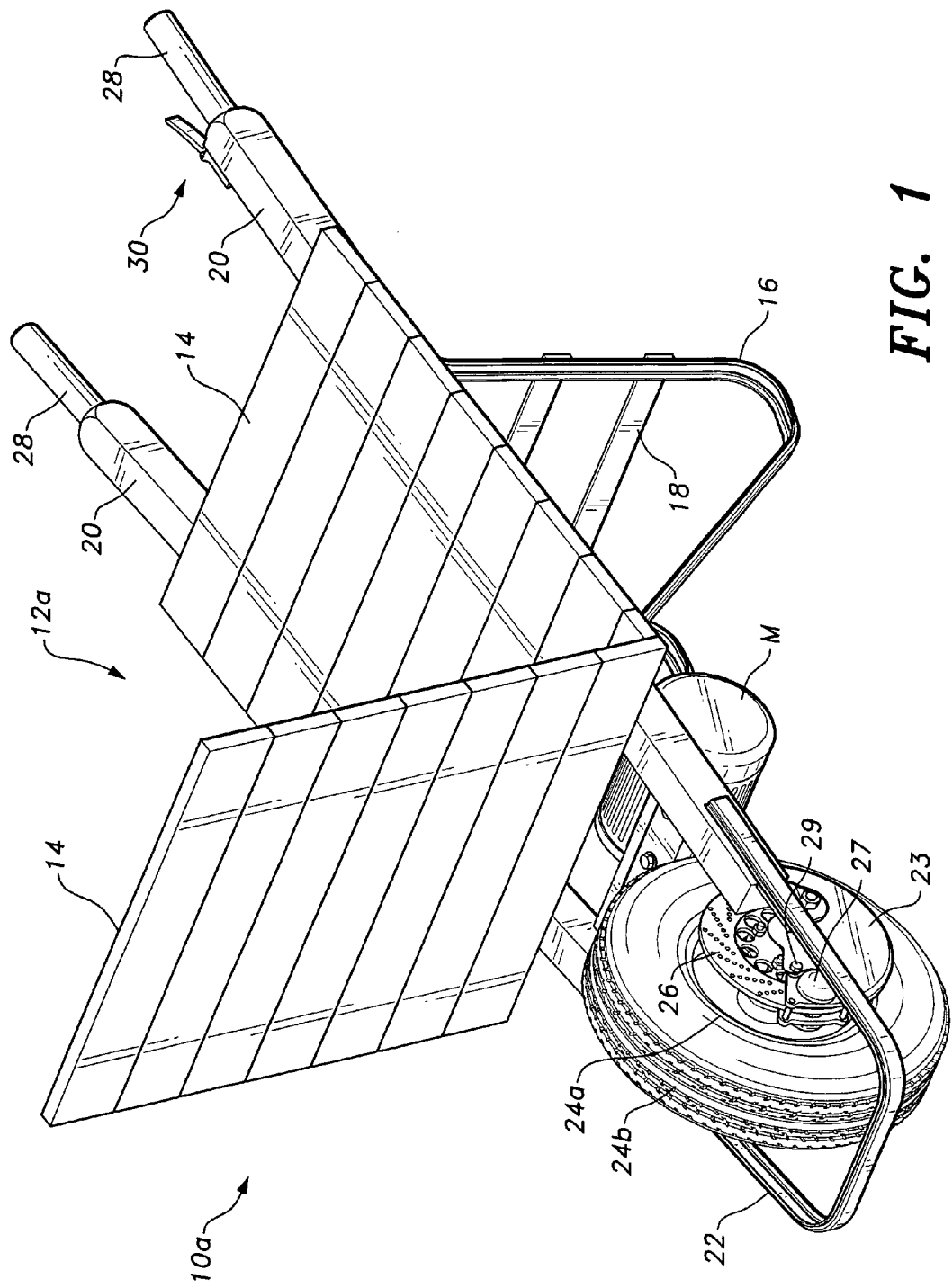
FIG. 1 is a side perspective view of the motorized wheelbarrow according to the present invention.
Figure 2:
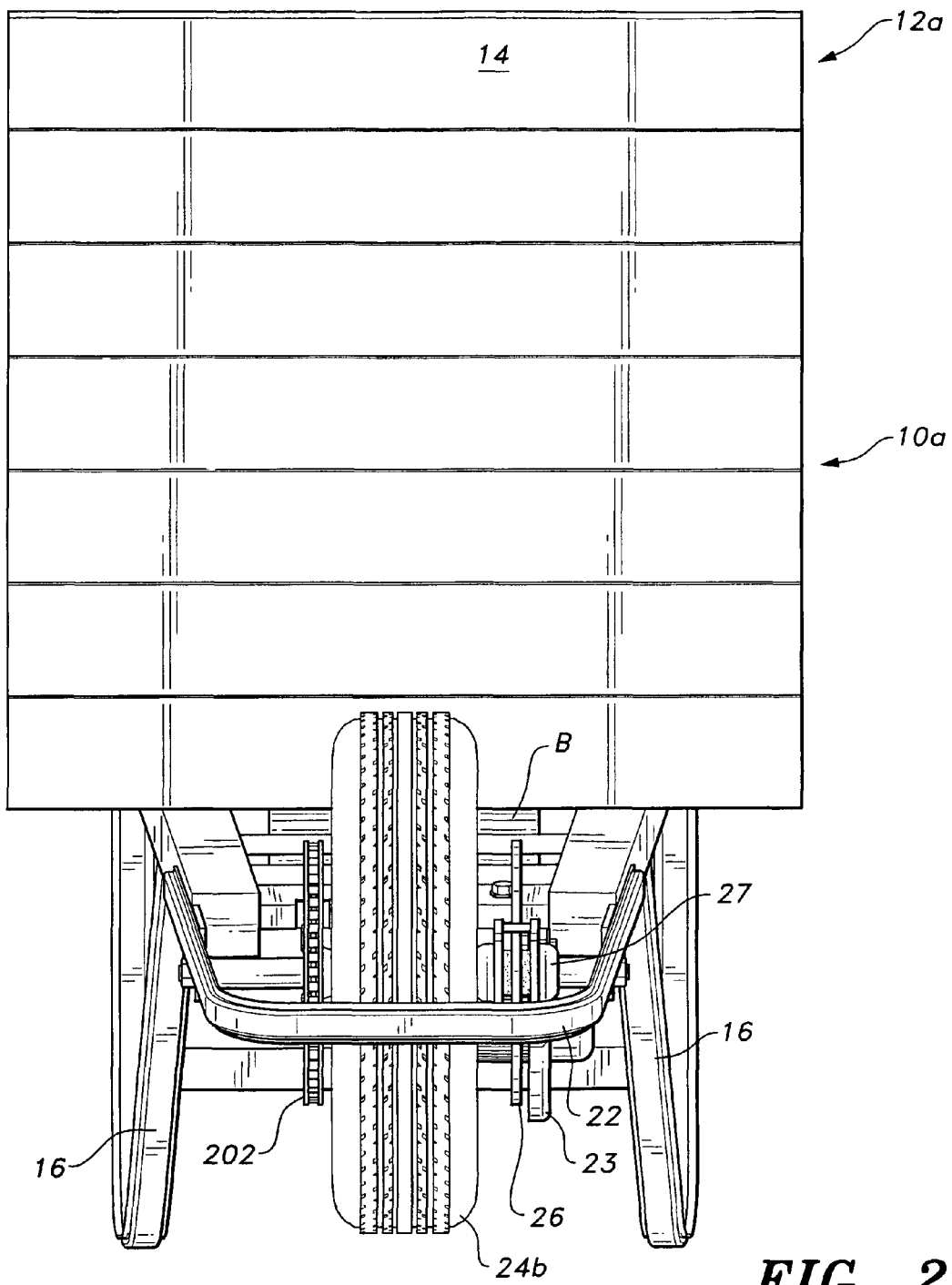
FIG. 2 is a front view of the motorized wheelbarrow according to the present invention.
Figure 3:
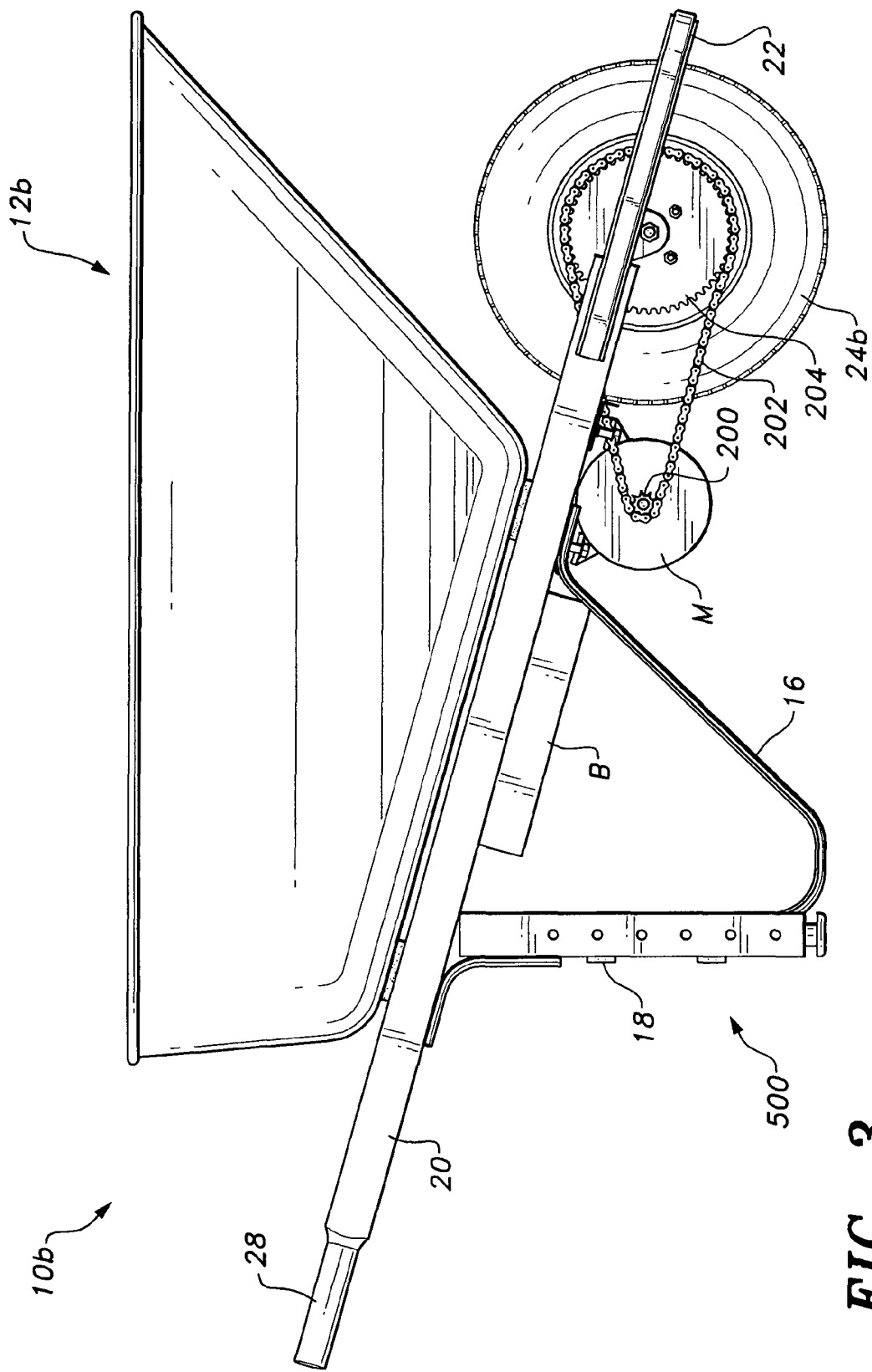
FIG. 3 is a side view of the motorized wheelbarrow with a load-bearing tub according to the present invention.
Figure 4:
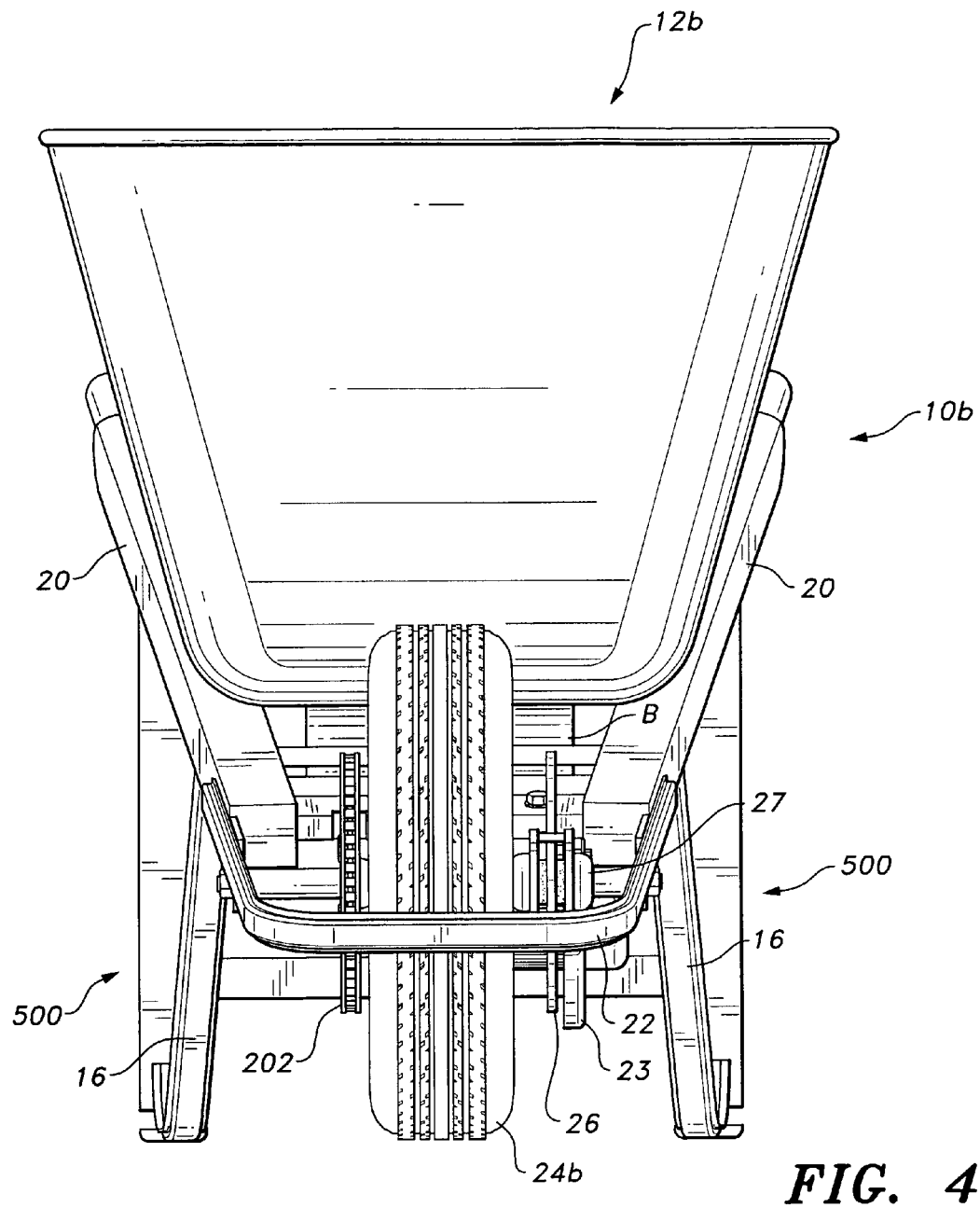
FIG. 4 is a front view of the motorized wheelbarrow according to the present invention.

The barrow 10a, 10b may be constructed of 1¼ inch aluminum tubing for strength and lightweight. Moreover, each wheelbarrow 10a, 10b can be more specifically designed for carrying heavier weights such as cement blocks, bricks, mortar, and bulky everyday household items. Tubular legs 500 are adjustable to one of a plurality of available height positions. As shown in FIG. 1, wheelbarrow 10a comprises a load rack 12a. Load rack 12a is comprised of a plurality of planar members 14 configured in an L shape to provide bottom and longitudinal support of a variety of loads. As shown in FIG. 3, wheelbarrow 10b comprises a load bucket 12b. Load bucket 12b is a typical wheelbarrow configuration that is suitable for carrying easily shifting loads such as dirt, sand, gravel, or the like. Both types of wheelbarrows may have longitudinally extending support frame members 20, which extend into handle portions 28.

For precise movement control of both barrows 10a, 10b, a disk brake is provided with a preferably seven inch diameter disk 26 that is mounted on a sixteen inch diameter die cast wheel 24a and attached to mounting points on U tube wheel frame 22. A wheel shield 23 is provided and mounts to U tube wheel frame 22. Brake caliper 27 is disposed over the brake disk 26 and is mounted to the wheel shield 23 via mounting bolts such as mounting bolt 29. A pneumatic tire 24b may be mounted on the wheel 24a.

Figure 9:
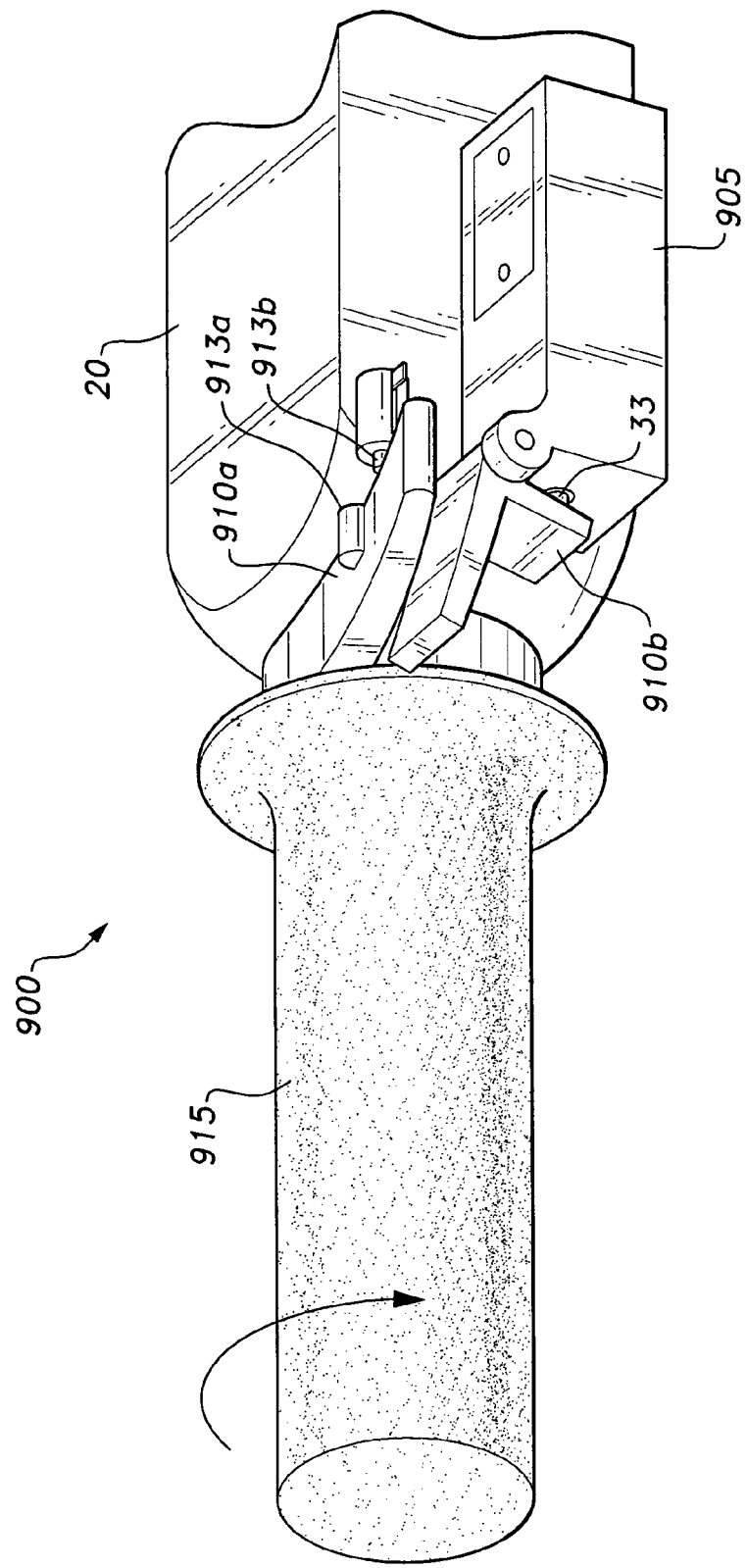
FIG. 9 is a perspective view of a twist grip brake control of the motorized wheelbarrow according to the present invention.

As shown in FIG. 9, a lockable twist grip control 900 is provided for control of the brake with minimum operator hand movement. A member coaxially mounted to the twist grip handle 915 has a laterally extending elongate portion 910a. The brake cylinder is disposed on frame member 20 to expose cylinder piston 33 for actuation control. The laterally extending elongate portion 910a engages L shaped cylinder control member 910b for selective activation of brake cylinder piston 33 when the twist grip handle 915 is rotated. Brake lock receiver 913a has an indentation or aperture and is disposed on elongate portion 910a. Slidable brake lock pin 913b is disposed on the support frame 20 and can slide to engage indentation or aperture of the brake lock receiver 913a to lock piston 33 of brake cylinder 905 in to a brake actuated position.

Figure 8:
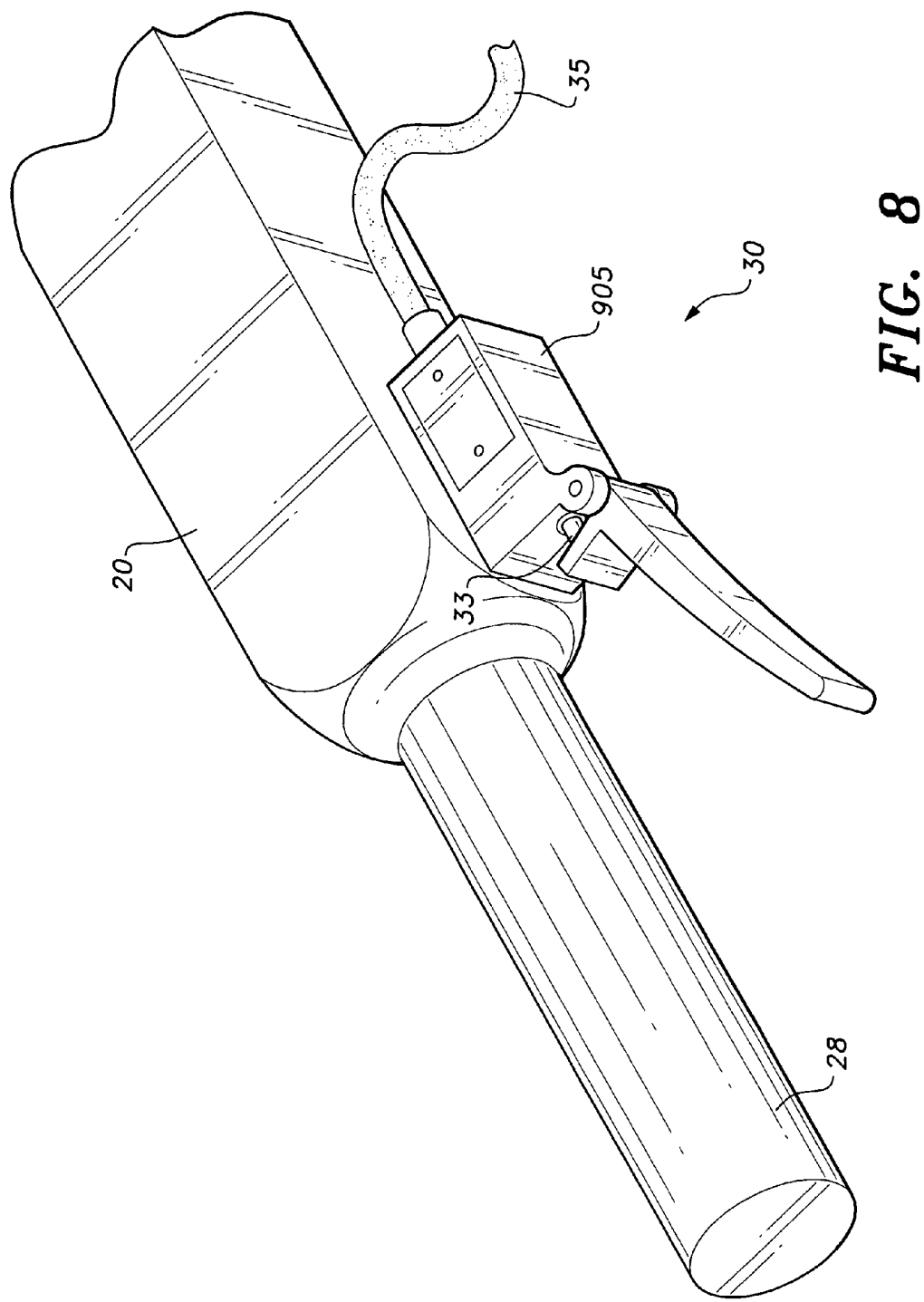
FIG. 8 is a perspective view of a lever brake control of the motorized wheelbarrow according to the present invention.

Alternatively, as shown in FIGS. 1 and 8, a thumb operated brake lever 30 may be provided. The brake lever 30 is pivotally disposed on body of the brake cylinder 905 so that when an operator squeezes the lever, base portion of the lever pivots toward the cylinder body and actuates piston 33 which forces brake fluid down tube 35 to activate the brake. When an operator uses either control 900 or control 30 for braking, the barrow 10a or 10b can be guided to dump loads precisely and with ease.

Figure 5:
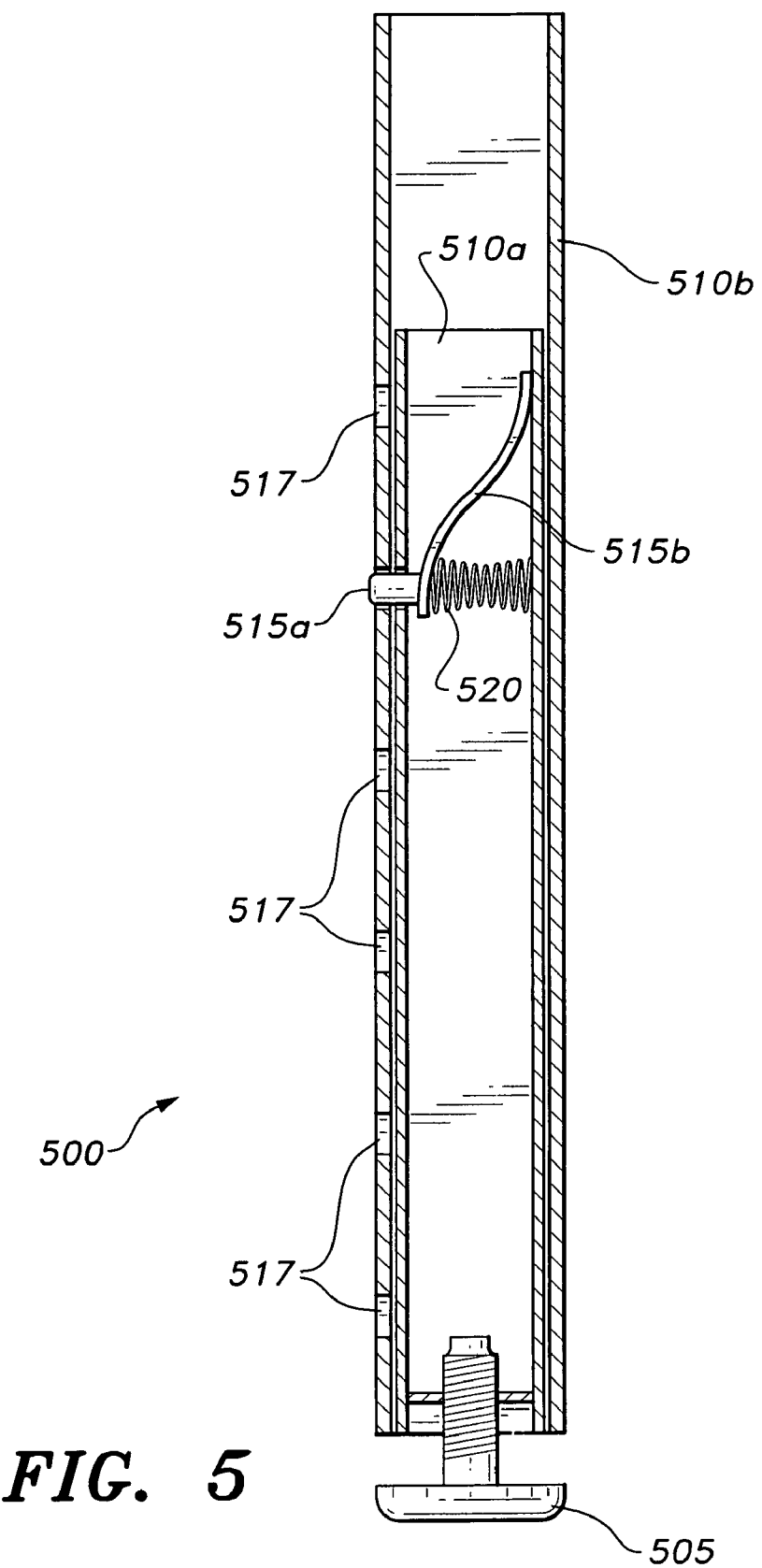
FIG. 5 is a side view of a height adjustable leg of the motorized wheelbarrow according to the present invention.

As shown in FIG. 5, tubular legs 500 may be incorporated for barrow support and may be cooperatively attached to support strut 16 and support strut brace 18, the strut 16 being attached to support frame member 20. Tubular legs 500 are attached to and extend from a respective support frame member 20. Each tubular leg 500 may preferably be constructed of stainless steel tubing, and comprises an inner tube 510b that slidably engages an outer tube 510a, the assembly utilizing a spring button lock so that the inner tube 510b is lockable in a plurality of positions with respect to the outer tube 510a thereby adjusting height of the leg 500.

The spring button lock is comprised of engagement pin 515a affixed to inner tubular leg 510b via spring attachment member 515b, the spring button lock being axially aligned with engagement pin spring 520 to engage alignment holes 517 disposed at lengthwise intervals on outer tube 510a. It is within contemplation of the present invention that other means known to a person having ordinary skill in the art may be employed to adjust height of legs 500.

The electric drive motor M is rechargeable, and may be direct current or alternating current. As shown in FIGS. 1 and 3, the motor M is attached to a front portion of the support frame members 20 underneath load rack 12a or load bucket 12b, depending on the barrow type.

A power source, such as exemplary 24-volt battery B, is disposed underneath frame members 20 proximate motor M and may have a recharging plug or receptacle that can be connected to a charging source. The power train is direct without the need of a gearbox thereby cutting down on empty weight of the barrow. Power from motor M is transferred to wheel 24 via a chain drive. The chain drive has motor sprocket 200, wheel sprocket 204, and chain 202. Motor sprocket 200 is attached to an output shaft of motor M in order to apply rotational torque to the chain 202. Chain 202 interconnects sprockets 200 and 204. This allows the power from motor M to be transferred to wheel 24 when motor M is energized.

Figure 6:
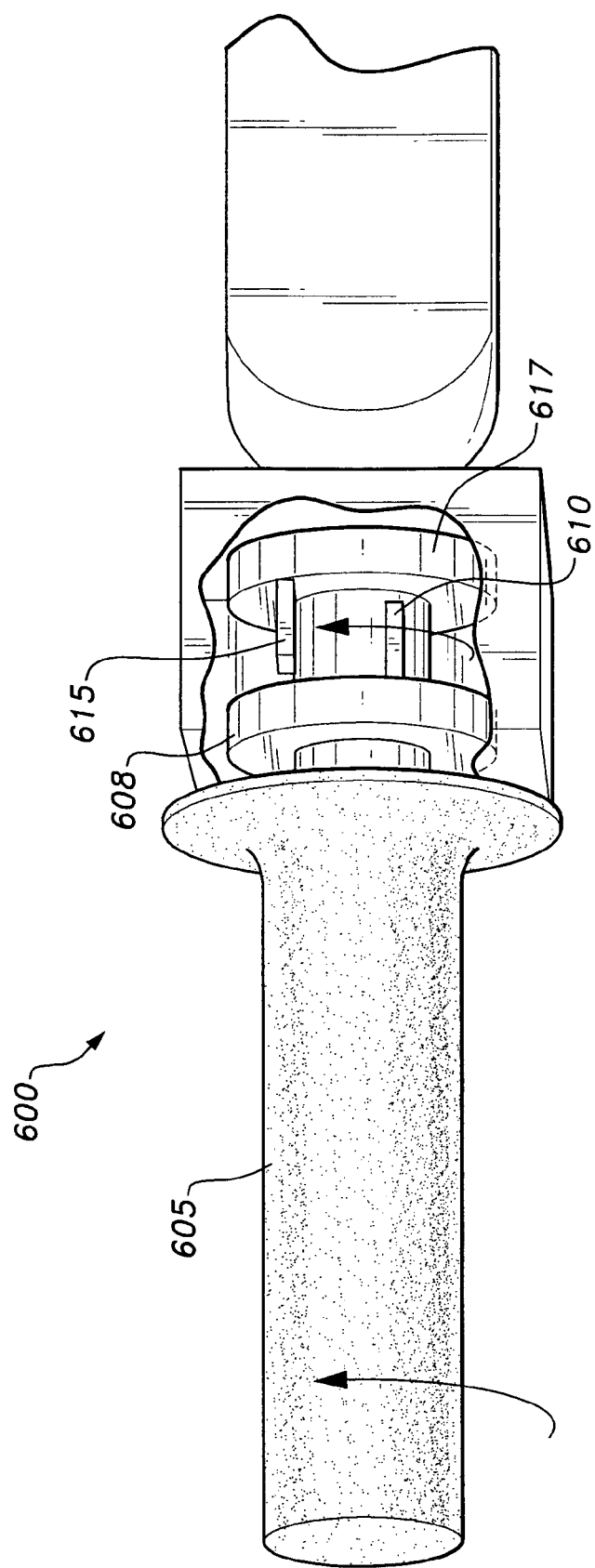
FIG. 6 is a perspective, partial cutaway view of a twist grip motor control of the motorized wheelbarrow according to the present invention.
Figure 7:
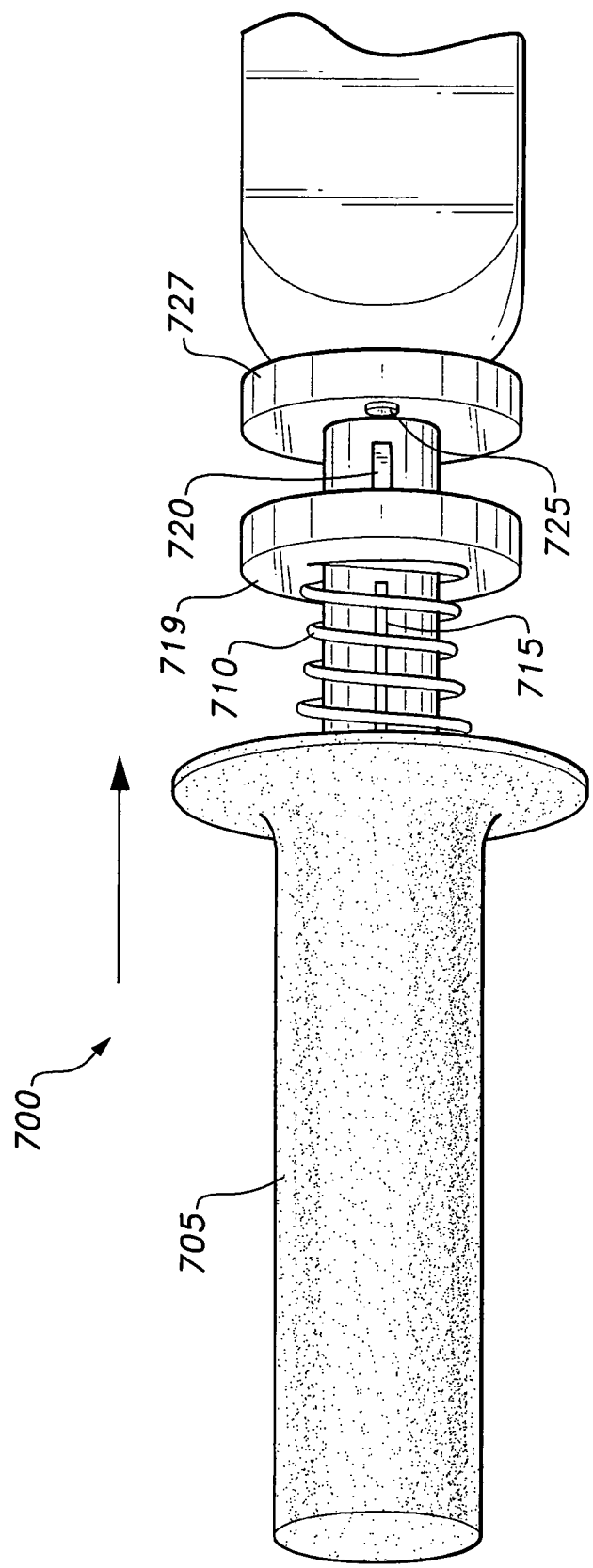
FIG. 7 is a perspective, partially exploded view of a push grip motor control of the motorized wheelbarrow according to the present invention.

As shown in FIGS. 6-7, on/off state of the motor M is controlled by a spring biased switch that can be either a twist grip motor control 600 or a push grip motor control 700. The twist grip motor control 600 has a twist grip handle 605 that can be rotated against a spring bias that keeps the motor normally open, i.e., throttle off. A switchblade mounting boss 608 is attached to the handle. The mounting boss 608 receives an electrical switchblade 610. A fixed electrical switch contact mounting boss 617 is disposed proximate the twist rotational switchblade 610. A fixed switch contact 615 is attached to and extends from the switch contact mounting boss 617. When an operator rotates the twist grip handle 605 the switch blade 610 rotates until it comes in contact with switch contact 615 to complete a power electrical circuit to the motor M thereby energizing motor M to apply locomotive power to the wheelbarrow 10a or 10b.

Alternatively, push grip motor controller 700 is designed for axial movement to energize the motor M. The push grip motor control 700 has a push grip handle 705 which can be displaced axially along guide slot 715 against a spring bias that keeps the control normally open, i.e., throttle off. Cylindrical member 719 has an axial through bore so that the cylindrical member 719 can be mounted over fixed cylindrical extension of the push grip 705. Spring 710 is mounted between the cylindrical member 719 and the push grip 705 to apply bias to keep the controller in a normally open, throttle off position. A switchblade 720 is disposed on and extends away from opposite side of cylindrical member 719. When the push grip handle 705 is pushed, it travels forward to advance the switchblade 720 until the switchblade 720 abuts switch contact 725, which is disposed in fixed switch contact boss 727. When blade 720 and contact 725 abut, a power circuit is completed to energize motor M.

Moreover, either switch 600 or switch 700 may be configured with electronic circuitry such that once the motor is turned on, further twisting torque or pushing force by the operator results in more power being applied to the drive motor M and vice versa. Spring bias of switch 600 or switch 700 biases the switch in the off position so that the user must apply positive force to grips on the switch control to activate the motor.

Removable side rails (not shown) may be provided to constrain lateral movement of wheelbarrow cargo. The side rails can be stored on the side frame of barrow 10a.

It should be understood that the disk braking system could be applied as a kit to be assembled to an ordinary wheelbarrow.

It is to be understood that the present invention is not limited to the embodiments described above, but encompasses any and all embodiments within the scope of the following claims.

We claim:

1. A motorized wheelbarrow, comprising:
   a pair of longitudinally extending support frame members;
   a pair of handles secured to a rear portion of the support frame members;
   an electric drive motor disposed below the frame members;
   an electrical motor power source disposed on the wheelbarrow, the power source being electrically connected to the electrical motor;
   a wheel support member attached to a front end of the longitudinally extending support frame members;
   a wheel freely rotatable on the wheel support member;
   a support strut attached below each of the support frame members;
   a vertically adjustable support leg attached to and extending from the support frame member, the adjustable support leg being attached to the support strut;
   a chain and sprocket drive mechanism having a motor sprocket attached to a drive shaft of the motor;
   a wheel sprocket attached to the wheel, the chain of the drive mechanism interconnecting the motor sprocket and the wheel sprocket;
   an operator-switchable control electrically connected to the electrical motor, the control having an electronic circuit for responding to operator input to provide variable power to the drive motor based on the operator input, wherein the control comprises a spring biased push grip motor control mounted in the handle;
   brake means for safe stopping of the wheelbarrow, said brake means including a brake control element and a twist grip control attached to the wheelbarrow handle, said twist grip control further including a laterally extending portion for engaging said brake control element upon rotation of said twist grip control, the twist grip control being lockable in a brake actuating position; and
   a load carrying structure secured atop the frame.

2. The motorized wheelbarrow according to claim 1, wherein the electrical motor power source comprises a battery.

3. The motorized wheelbarrow according to claim 1, wherein the load carrying structure is a load bucket.

4. The motorized wheelbarrow according to claim 1, wherein the load carrying structure is a load rack having at least two planar members configured in an L shape to provide bottom and longitudinal support for a variety of loads.

5. The motorized wheelbarrow according to claim 1, wherein said brake means further includes:
- a hydraulically operated disk brake operably connected to the wheel; and
- a hydraulic control circuit operably engaged to the hydraulically operated disk brake for safe stopping of the wheelbarrow.

6. The motorized wheelbarrow according to claim 5, further comprising:
- a hydraulic control line; and
- a brake caliper disposed over the disk, the brake caliper being attached to a frame portion of the wheelbarrow and receiving a first end of the hydraulic control line.

7. The motorized wheelbarrow according to claim 6, further comprising:
- a master cylinder connected to the hydraulic control line; and
- a braking control member connected to the master cylinder;
- wherein hydraulic pressure delivered by the master cylinder to the caliper is adjustable via user operation of the braking control member.

8. The motorized wheelbarrow according to claim 7, wherein the braking control member comprises a twist grip attached to the wheelbarrow handle, the twist grip device being lockable in a brake actuating position.

9. The motorized wheelbarrow according to claim 1, wherein the vertically adjustable support leg comprises:
- an elongate outer tubular member having a plurality of height adjustment throughbores;
- an elongate inner tubular member slidably disposed within the outer elongate tubular member;
- an engagement pin having a spring attachment member, the spring attachment member being affixed to the inner tubular member; and
- a coil spring, the coil spring being coaxially aligned in contact with the engagement pin;
- wherein the engagement pin engages the height adjustment throughbores of the outer tubular member to thereby adjust a height of the wheelbarrow.

* * * * *